United States Patent [19]

Ellis

[11] 4,332,087
[45] Jun. 1, 1982

[54] V-BELT MEASURING DEVICE
[75] Inventor: John T. Ellis, Chicago, Ill.
[73] Assignee: Illinois Tube Company, Skokie, Ill.
[21] Appl. No.: 161,677
[22] Filed: Jun. 23, 1980
[51] Int. Cl.³ .............................................. G01B 3/02
[52] U.S. Cl. ...................................... 33/137 R; 33/189
[58] Field of Search ............................. 33/137 R, 189
[56] References Cited
U.S. PATENT DOCUMENTS
1,904,048 4/1933 Hill .................................... 33/137 R Primary Examiner—Steven L. Stephan
Attorney, Agent, or Firm—Lockwood, Dewey, Alex & Cummings

[57] ABSTRACT

A V-belt measuring device is provided for directly determining the size of a V-belt needed for a particular belt-drive mechanical system without the need for subsequent calculations. The measuring device is substantially complimentary in cross-section to the generally V-shaped grooves in the pulleys of the belt-drive system, and includes a bevelled end portion and a central contact portion which cooperate while tension is applied to the device to directly indicate a proper replacement belt size.

2 Claims, 6 Drawing Figures

U.S. Patent  Jun. 1, 1982  4,332,087
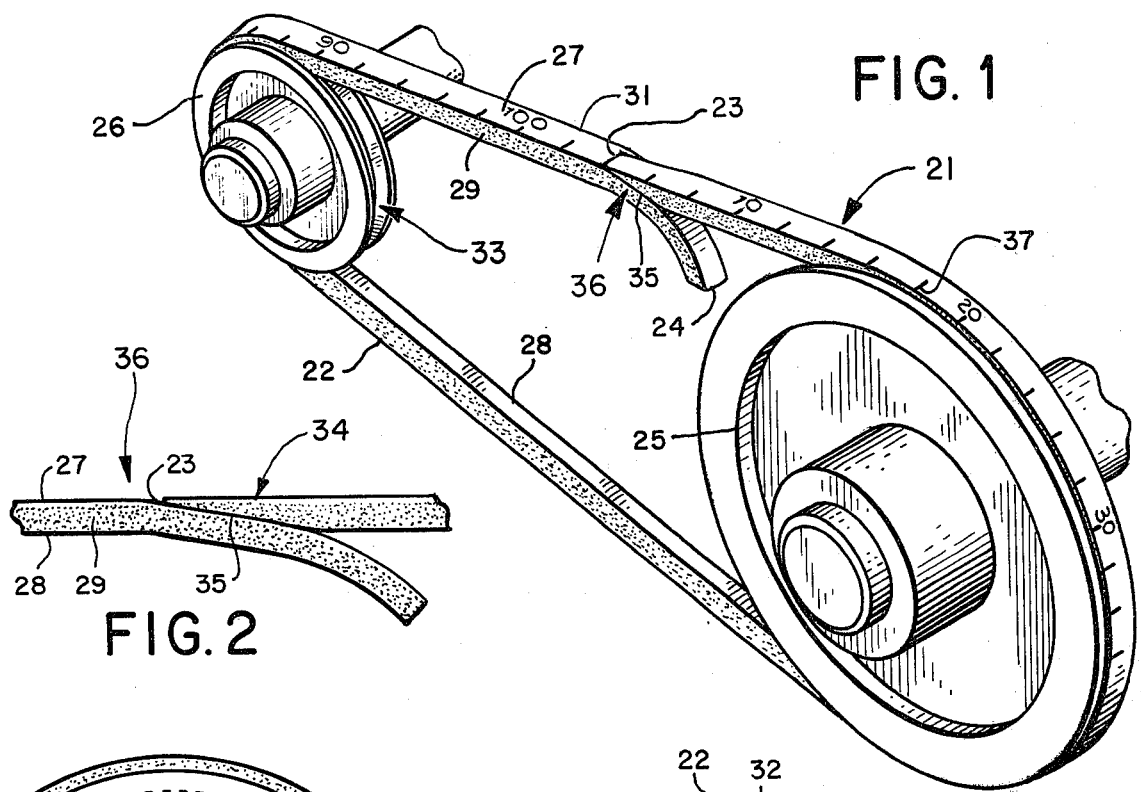
FIG. 1
FIG. 2
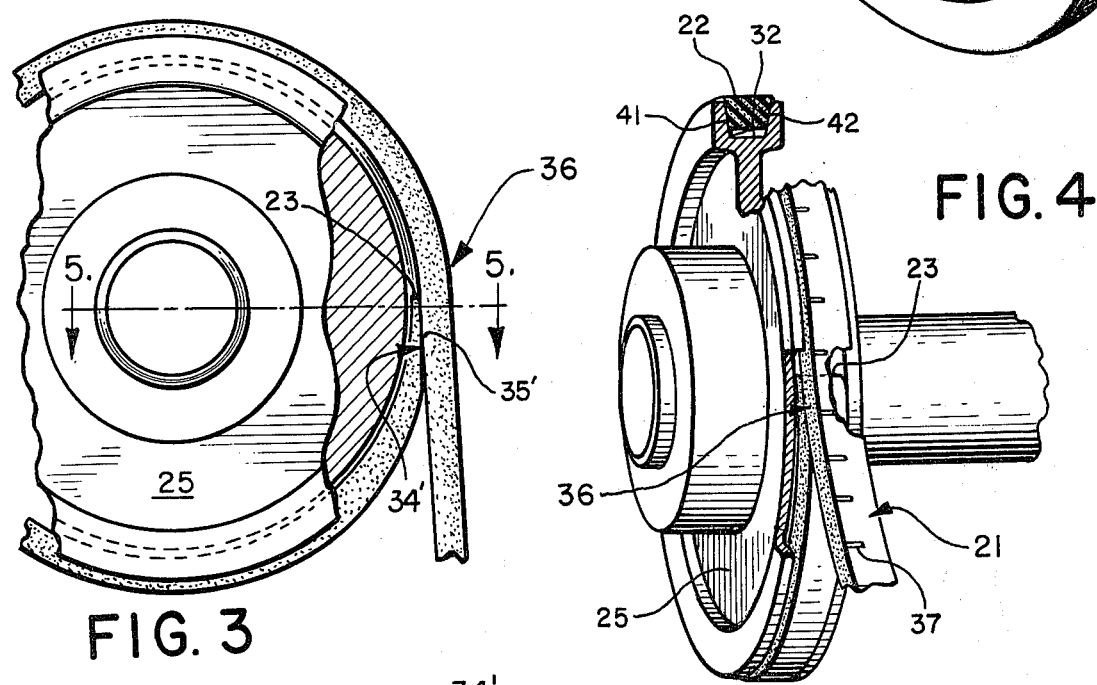
FIG. 3
FIG. 4
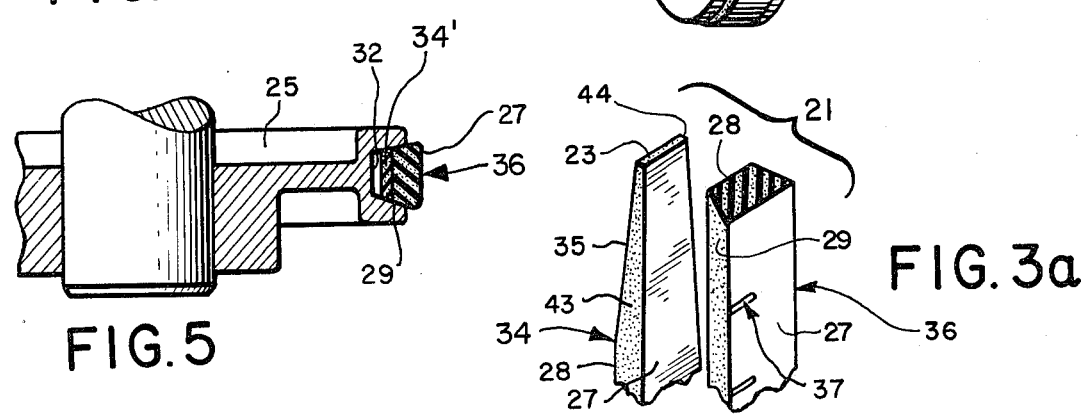
FIG. 5
FIG. 3a

V-BELT MEASURING DEVICE

BACKGROUND OF THE INVENTION

This invention relates generally to a measuring device, and more particularly to a device for measuring the length or size of a V-belt needed for a belt-drive system. The device is generally V-shaped in cross-section and includes a bevelled length at an end for simultaneously indicating the belt length or size needed for the belt drive system being measured and for providing a complementary underlying relationship with another length of the device in order to bring about accurate measurement without the need for mathematical calculation.

Heretofore, when one wished to replace a V-belt within a belt-drive system of commercial machinery, appliances, vehicles or the like, if the precise replacement size was not known, it was necessary to wind a tape measure over the pulleys and along the spans between the pulleys in order to obtain a measurement which, because of the thinness of the tape measure, corresponded to that defined by the inside surfaces of the pulley grooves within which the V-belt fitted. Then, a correction factor dependent on the belt shape and size was applied to obtain the actual belt length, taken along the belt path at a location between the inside and outside surfaces of the replacement belt, the exact location depending upon the style of the belt being measured.

To alleviate the difficulty of taking this measurement, it was conventional to revise the tape measure reading by using charts of correction factors. Unfortunately, these charts were based on mathematical approximations, which undesirably, varied depending upon distances between pulleys and pulley sizes in the belt system. As can be appreciated, such correction factors were typically not available for unusual situations, such as where one belt pulley was substantially larger than other belt pulleys in the system, causing the tape measurement taken along the exceptionally large pulley to be substantially less than the length of a V-shaped belt which would be needed for such a system.

Besides being undesirably inaccurate, the tape measurement system practices heretofore employed were tedious and time-consuming and required a certain amount of skill and understanding on the part of the person doing the measurement and calculations. It was also not possible to judge belt-system tension when measuring with a tape, since the tape was not sized or configured like the V-belt needed in the system.

By the present invention, the disadvantages attendant to using a tape for measuring V-belt spans for belt-drive systems are substantially eliminated, as is the need to make a detailed mathematical analysis and proceed with mathematical corrective steps in order to accurately determine the V-belt size or length needed to replace a worn or broken belt. The present invention avoids measurement distortions brought about by using a tape of sizing and configuration different from that of the belt whose replacement path it is used to measure, while simultaneously providing a degree of belt tension determination so that the measurement taken is that for a situation having the desired amount of tension within the belt to be installed.

The present invention provides a V-belt measurement device for accurately determining the belt size or length needed for any of a variety of belt-drive systems, the device including a flexible elongate member having an origin end and a termination end, the flexible elongate member being trapezoidal or generally V-shaped in cross-section substantially along its length, there being a bevelled length near the origin end, with the narrowest point of the bevelled length being at the origin end, the bevelled length being structured for closely lying along a contact length of the flexible elongate member whereby the bevelled length and the contact length operatively interengage with each other while the device is within circumferential or annular grooves of pulleys within a system in order to accurately measure replacement belt size, by way of indicia on the flexible elongate member, with the origin end being the zero indicator.

It is accordingly a general object of the present invention to provide an improved V-belt measurement device.

Another object of this invention is an improved device for measuring the length of a V-belt needed within a belt-drive system without having to proceed with subsequent calculations using mathematical approximations to compensate for pulley groove depth and length, pulley diameter and the like.

Another object of the present invention is an improved V-belt measuring device having a structural configuration complementary to that of the pulley groove in which the replacement V-belt will lie.

A further object of this invention is an improved measuring device having a cross-section substantially the same as that of the V-belt being replaced.

Another object of the present invention is a V-belt measuring device that is readily and accurately used when measuring the belt run length of a belt-drive system having pulleys with a wide disparity in diameter sizes including one pulley of an exceptionally large diameter.

Another object of the present invention is an improved V-belt measuring device in which the measurement taken includes accommodation for the extent of tension desired within the replacement belt when installed.

These and other objects of this invention will become apparent from the following detailed description, taken in conjunction with the accompanying drawings, wherein:

FIG. 1 is a perspective view of the present invention when in use outside of a pulley groove for measuring the length of a V-belt needed for the illustrated belt-drive system;

FIG. 2 is a side elevation view of a portion of the invention as depicted in FIG. 1;

FIG. 3 is a side elevational view, partially broken away, of the present invention when in use within a pulley of a belt drive system;

FIG. 3a is a detail view of the origin end of the device showing a preferred structure of the bevelled length, together with a corresponding contact length of the device;

FIG. 4 is a perspective view, partially broken away, of the FIG. 3 embodiment; and FIG. 5 is a partial sectional view along the line 5—5 of FIG. 3.

The V-belt measuring device in accordance with this invention, generally designated as 21 in FIG. 1, includes a flexible elongate member 22 having an origin end 23 and a termination end 24. Device 21 is illustrated in use measuring the length of a continuous V-shaped belt needed to accurately span, with proper tension, a mechanical belt-drive system that includes a pulley 25 and a pulley 26. The pulleys 25, 26 need not be identical; for example, in the illustrated system, one of the pulleys 25 is larger than the other pulley 26.

Flexible elongate member 22 has a structure and a general cross-sectional configuration substantially the same as that of a continuous V-belt that is utilized on the belt-drive system being measured for a replacement belt. Typically, as illustrated in the drawings, the cross-section of the elongate member 22 will be generally trapezoidal, or on the order of a truncated "V", having an outside surface 27 and an inside surface 28, the inside surface 28 being narrower than the outside surface 27, whereby the elongate member 22 includes two generally opposing tapering side surfaces 29, 31 extending between and joining the outside surface 27 and the inside surface 28. Such a structure and configuration of the member 22 is generally complementary with an annular groove 32 and an annular groove 33 of the pulleys 25 and 26, respectively, whereby the elongate member 22 fits within grooves 32, 33 in much the same manner that the type of belt needed for the system fits therewithin, including operative interengagement between the elongate member tapering side surfaces 29, 31 and the typically tapering side walls 41, 42 (FIG. 4) of the grooves 32, 33.

Elongate member 22 includes a bevelled length, generally designated as 34, 34', which is a modified scarf joint for the device that includes a wedge surface 35, 35' tapering down in the direction of the origin end 23. In the preferred embodiment illustrated in FIG. 3a, the wedge surface 35 runs from the inside surface 28 to the origin end 23 while cutting away portions of the side surfaces 29, 31 as well as of the inside surface 28. By an alternative embodiment, illustrated in FIGS. 3 and 4, the bevelled length 34' has its wedge surface 35' cutting away a portion of the outside surface 27, tapering down from the outside surface 27 to the origin end 23 while cutting away a portion of the side surfaces 29, 31.

The trapezoidal or truncated V-shape of the elongate member 22 is structured such that its configuration that is complementary with the grooves 32, 33 continues through the bevelled length 34 or 34' in order to insure that an accurate replacement belt measurement is made. More particularly, the side surfaces of the bevelled length itself tapered in the same manner as the remainder of the length of the side surfaces 29, 31 throughout the rest of the flexible elongate member 22, while the contact length portion thereof, generally designated 36, which closely lies along the tapered length 34 or 34', being a portion of the elongate member 22, also has a configuration substantially the same as that of the continuous V-belt to be replaced.

In one embodiment of this invention, the bevelled length 34 or 34', is bevelled in another dimension also to provide side bevel surface 43 and 44 whereby the widths of both the inside surface 27 and the outside surface 28 are narrowest at the origin end 23 while typically being at their maximum width at the location where the bevelled length 34 or 34' begins. Such side bevel surfaces 43 and 44 provide additional clearance for the bevelled length 34 or 34' when it lies within a pulley groove 32 (FIGS. 3, 4 and 5) such that the bevelled length seats down enough within the groove 32 so that the contact length 36 is substantially fully seated along the groove side walls 41 and 42 to ensure accurate replacement belt measurement.

Positioned along the outside surface 27 are a plurality of belt size or distance indicia 37 including numerical markings to directly designate the size of replacement belt needed, by specifying, for example, a belt length, in inches, centimeters or the like, with the origin end 23 being the "zero" designation.

In use, the V-belt measuring device 21 is threaded through the belt-drive system until the bevelled length 34 or 34' lies along a contact length 36 of the elongate member 22. By the use depicted in FIGS. 1 and 2, the origin end directly designates the correct belt size by supplying the "zero" indication that overlies one of the indicia 37 to directly designate the needed replacement belt size after the individual doing the measuring grasps and pulls on the device 21 near the origin end 23 and the termination end 24 so as to approximate the tension desired in the continuous replacement belt, as installed for driving use. By the use depicted in FIGS. 3, 4 and 5, the bevelled length 34 or 34' is placed within one of the pulley annular grooves 32 or 33, with the remainder of the device 21 being threaded through the belt drive system until a contact length 36 is located within the same pulley groove as the bevelled length. The needed tension is imparted to the device by grasping and pulling near the termination end, and the origin end or "zero" designation is observed under the contact length by plying the origin end away from close contact with the groove walls while keeping the device in the same location as when it was tensioned.

Such viewing provides an immediate and direct determination of the size of the continuous V-belt that is needed for the particular belt-drive system being measured, such directly measured length or size being a measurement along the path by which the particular type of replacement belt needed is measured, such location of measurement typically being somewhere between the outside surface 27 and the inside surface 28. Because the measurement is direct, there is no need to subsequently calculate the replacement belt size needed by use of the table of mathematical correction factors for the specific type of replacement belt, which tables vary somewhat depending upon the belt manufacturer, tapering sides angles, and the like. Also eliminated is the need to use a correction factor table to account for variations in pulley sizes, spacings between pulleys, and the like. Since the measurement is preferably also made with the V-belt measuring device 21 at the tension needed for the replacement belt, there is likewise no need to use a tensioning correction factor in order to identify the proper replacement belt.

Belt measuring device 21 may be made by any durable highly flexible material out of which continuous V-belts are manufactured, such as rubber compounds, cotton cords, or reinforced fabric, especially such cords reinforced with polyolefins such as polypropylene or other resins such as high density polyvinyl chloride. The markings and lettering needed to designate the indicia 37 can be applied in any manner that is substantially permanent, such as heat embossing or plasticized bonding.

It will be apparent to those skilled in this art that the present invention can be embodied in various forms; accordingly, this invention is to be construed and limited only by the scope of the appended claims.

I claim:

1. A V-belt measurement device for accurately determining the length required for a replacement belt for a belt-drive system, comprising:
   a flexible elongated body member having an origin end and a termination end, said body member having sufficient flexibility and length for winding about said system with a segment of said body member between said origin end and a point of divergence along said body member overlapping a portion of said body member;
   said body member having a generally truncated V-shaped cross-section substantially corresponding to the cross-section of the replacement belt, and including an outside surface, an inside surface narrower than said outside surface, and two generally opposing tapering side surfaces joining said outside and inside surfaces, said side surfaces tapering toward each other in the direction of said inside surface;
   said segment of said body member having a ramp surface extending substantially from said outside surface at said origin end to said inside surface of said body member at said point of divergence whereby said outside surface of said body member and said outside surface of said segment are substantially contiguous at said origin end, when said segment is positioned to overlap said portion of said body member; and
   size indicia along the length of said outside surface such that the point of overlap of said body member by said segment at said origin end indicates replacement belt length.

2. The V-belt measuring device of claim 1, wherein said segment of said body member comprises inwardly tapered side surfaces each extending from said point of divergence to said origin end whereby the width of said origin end corresponds substantially to the width of said inside surface of said body member.